June 11, 1968  N. O. OLSSON  3,387,751

FLUTED FEED MATERIAL DISTRIBUTOR

Filed Nov. 22, 1966  3 Sheets-Sheet 1

INVENTOR
NILS O. OLSSON

ATTY

June 11, 1968  N. O. OLSSON  3,387,751

FLUTED FEED MATERIAL DISTRIBUTOR

Filed Nov. 22, 1966  3 Sheets-Sheet 3

INVENTOR
NILS O. OLSSON

*McNeill*

ATTY

United States Patent Office 3,387,751
Patented June 11, 1968

3,387,751
FLUTED FEED MATERIAL DISTRIBUTOR
Nils O. Olsson, Ancaster, Ontario, Canada, assignor to International Harvester Company, Chicago, Ill., a corporation of Delaware
Filed Nov. 22, 1966, Ser. No. 596,239
5 Claims. (Cl. 222—267)

ABSTRACT OF THE DISCLOSURE

A fluted feed fertilizer metering device consisting of an elongated cylindrical member having smooth surfaced sections alternating with fluted sections forming pockets and rotatable within the fertilizer in a hopper. The fluted sections pick up fertilizer and discharge it by gravity, and the amount discharged is determined by the extent of exposure of the fluted sections to the outlets and this is regulated by axially shifting the entire cylindrical member.

---

This invention relates to agricultural implements and particularly to distributors for material such as fertilizer, seed and the like.

An object of the invention is the provision of novel metering mechanism for use in a distributor for fertilizer or the like.

Another object of the invention is to provide in a fluted feed distributor having bottom outlets, a cylindrical feed shaft substantially coextensive with the length of the hopper and having its entire length exposed to the material in the hopper, wherein smooth cylindrical shaft portions alternate with fluted portions which are filled with the material in the hopper but discharge only as much of the material as is contained in the portion of the flutes exposed to the discharge outlets.

Another object of the invention is the provision in a fluted feed distributor having spaced bottom outlets of a unitary cylindrical feed shaft having alternate smooth and fluted sections adapted to be rotated in the material in the hopper with the fluted sections in discharge relation to said outlets, wherein adjustable means is mounted on the hopper and operatively connected to one end of the feed shaft for shifting the latter axially.

Another object of the invention is the provision of a fed shaft mounted in and extending the length of a material distributor hopper and having alternate smooth and fluted sections, the entire shaft being rotatable in the material in the hopper, wherein a cut-off or scraper is mounted in the hopper and extends the full length thereof in operative engagement with the feed shaft to scrape fertilizer from the surface of smooth and fluted portions while insuring filling of the grooves in the fluted portions.

Other objects and advantages of the invention will become clear from the following detailed description when read in conjunction with the accompanying drawings wherein.

Figure 1:
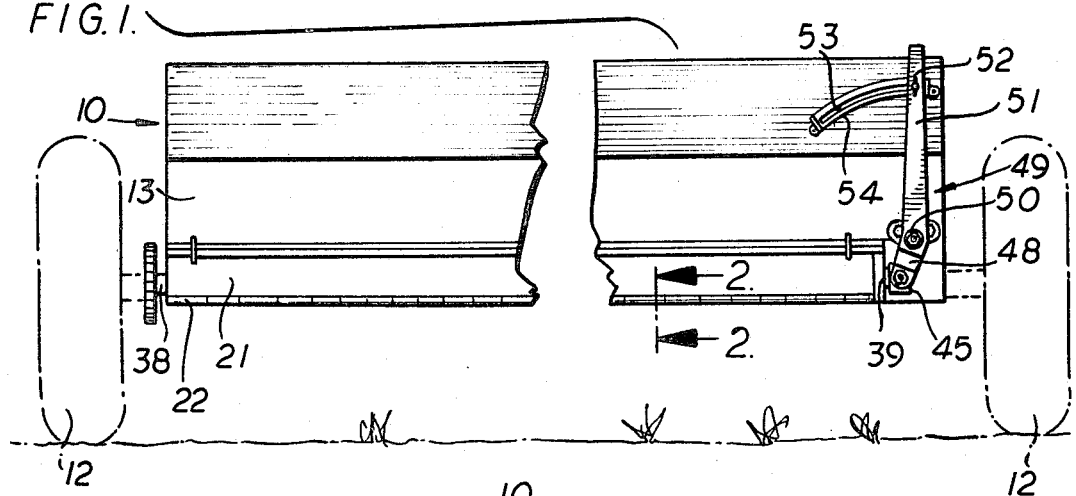
FIGURE 1 is a diagrammatic front elevation of a material distributor having metering mechanism incorporating the features of this invention.

The numeral 10 designates an elongated transversely extending hopper mounted on a conventional frame indicated at 11 and supported by wheels 12. Hopper 10 comprises front and rear walls 13 and 14, respectively, and end walls 15 and 16. The lower end of rear wall 13 is anchored to a bracket 17 including an angled part 18 secured to the frame 11 and a base member 19 extending rearwardly and downwardly and terminating in a hook portion 20.

The lower portion 21 of forward wall 14 is preferably releasably secured by any suitable means to the upper portion of wall 14, the lower portion 21 curving forwardly and terminating in a bearing 22 supporting a pivot pin 23, portion 21 forming part of the bottom of the hopper and capable of being released by means not shown and lowered about the pivot axis of pin 23 to remove fertilizer and to gain access to the lower portion of the hopper.

Also forming part of the bottom of the hopper is a curved wall portion 24 secured to end wall 15 by one or more bolts 25 and to supporting member 26 by bolts 27, the upper end of support 26 being secured to forward wall 10 by the same bolt 28 which secures bracket 17 thereto.

Figure 2:
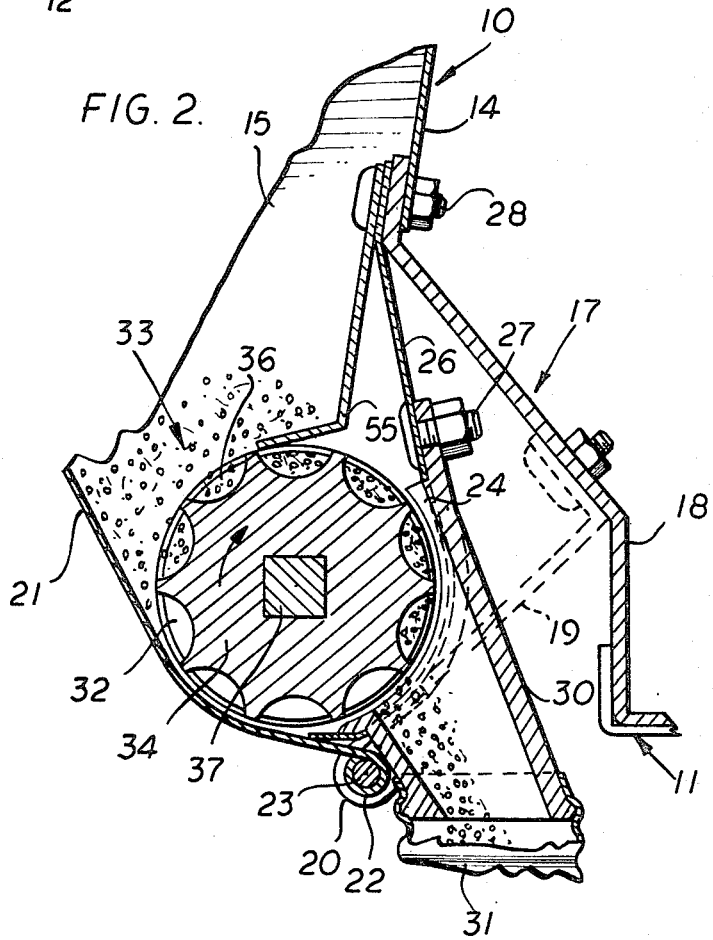
FIGURE 2 is an enlarged section taken on the line 2—2 of FIGURE 1.

The lower curved wall section 24 is provided with spaced openings 29 forming outlets for fertilizer discharged from the hopper and having tubular spouts 30 secured thereto, an extension of one wall of the spout being secured to plate 26 by the bolt 27. Flexible tubes indicated at 31 in FIGURE 2 are connected to the spouts to direct material from the hopper to the ground.

An elongated cylindrical metering device 32 is mounted in the bottom of the hopper lengthwise thereof in direct contact with the material in the hopper, such as fertilizer indicated at 33, and consists of metering sections or elements 34 separated by smooth surfaced spacers 35 of substantially the same diameter as the metering elements 34. The entire length of the cylindrical member 32 including the fluted sections 34 and the spacers 35 is rotatable in the hopper in contact with the fertilizer or other material and each element 34 is porvided with a plurality of axially extending circumferentially spaced grooves 36.

Member 32 is provided with a central bore to receive a square shaft 37 the ends 38 and 39 of which projecting from the cylindrical member are rounded, end 38 being received in the hub 40 of a gear 41 mounted in a bearing 42 carried by wall 15 of the hopper and driven by any suitable means, not shown, from one of the wheels 12.

The other end of cylindrical member 32 is mounted in a bearing 43 supported by a bracket 44 secured to the hopper 10, and the projecting end of shaft 39 is rotatable in a bearing 45 abutting a collar 46 and having studs 47 projecting from opposite sides thereof to pivotally receive the bifurcated lower end of arm 48 of a lever 49 fulcrumed upon a bolt 50 anchored to the wall 13 of hopper 10. The other arm 51 of lever 49 carries a detent 52 slidably receivable in an arcuate slot 53 formed in a quadrant 54 in a conventional manner and preferably having indicia thereon designating the position of the lever.

As will be noted in FIGURE 2, the bottom portions 21 and 24 of the hopper 10 are substantially concentric with member 32 and the latter is driven in the direction of the arrow clockwise, the upper grooves 36 and metering element 32 being always in contact with and filled with fertilizer in the hopper. In the opened position of the discharge outlets 29 shown in FIGURE 3, the entire length of each groove 36 filled with fertilizer during rotation of the cylindrical member discharges its fertilizer by gravity into spout 30 as it passes over it and again rotates into position to pick up more fertilizer. The grooves are always filled, and excess fertilizer is scraped from the periphery of the fluted section 34 as well as from the smooth surface of the spacers 35 by a cut-off or scraper 55 which extends the entire length of the member 32 and is secured to wall 14 of the hopper by bolts 28.

Figure 3:
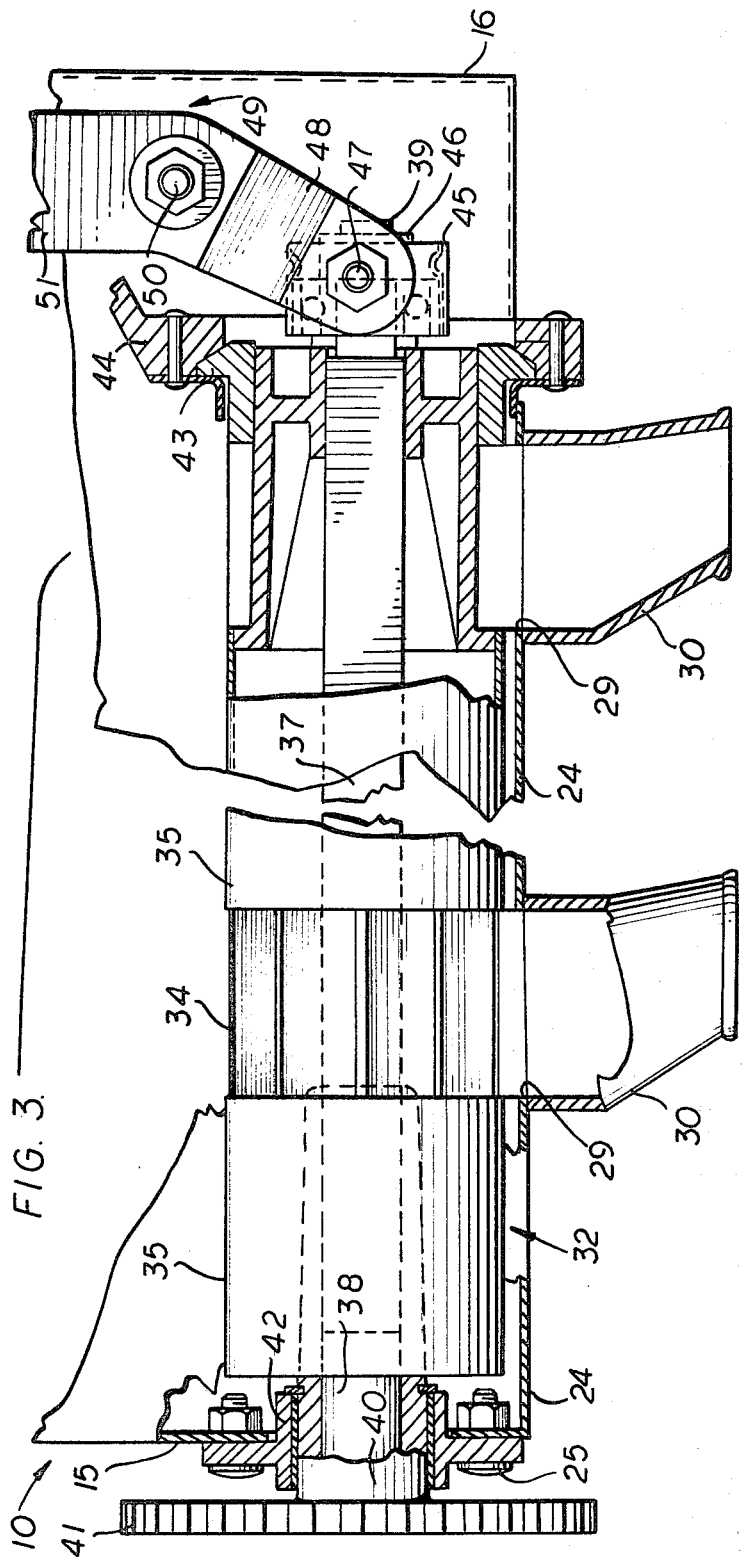
FIGURE 3 is an enlarged sectional view of the bottom of the hopper having the metering device of this invention mounted therein and showing the open position of the metering elements for discharging the maximum material from the hopper to the ground.
Figure 4:
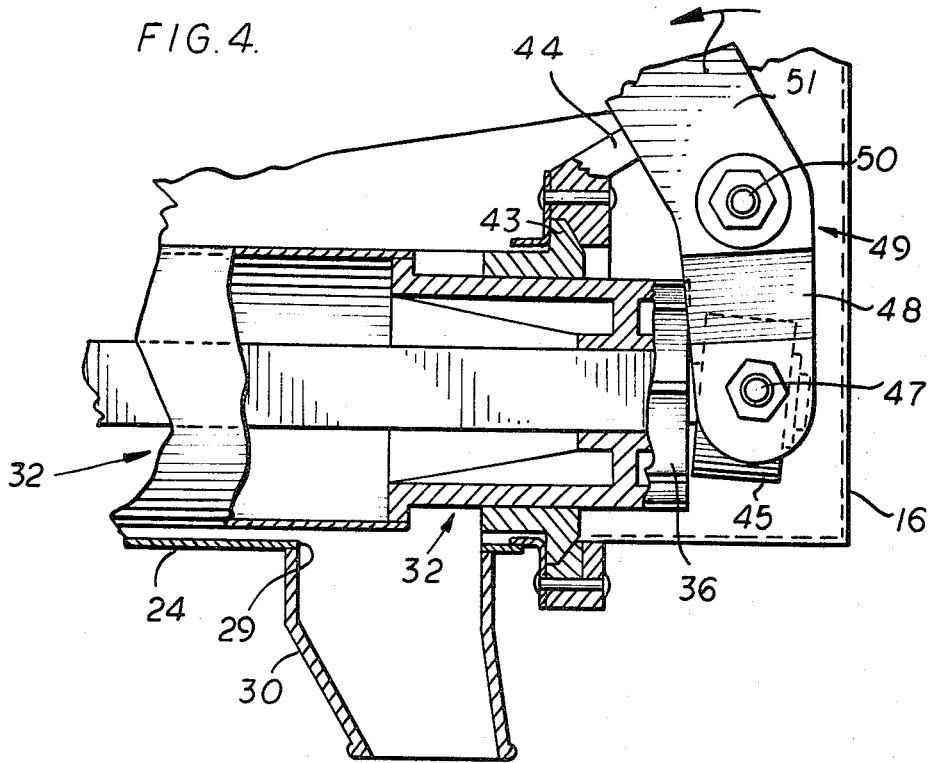
FIGURE 4 is an enlarged sectional detail of a portion of the structure shown in FIGURE 3 illustrating the relationship of the metering device to the discharge outlets when the latter is partly closed.
Figure 5:
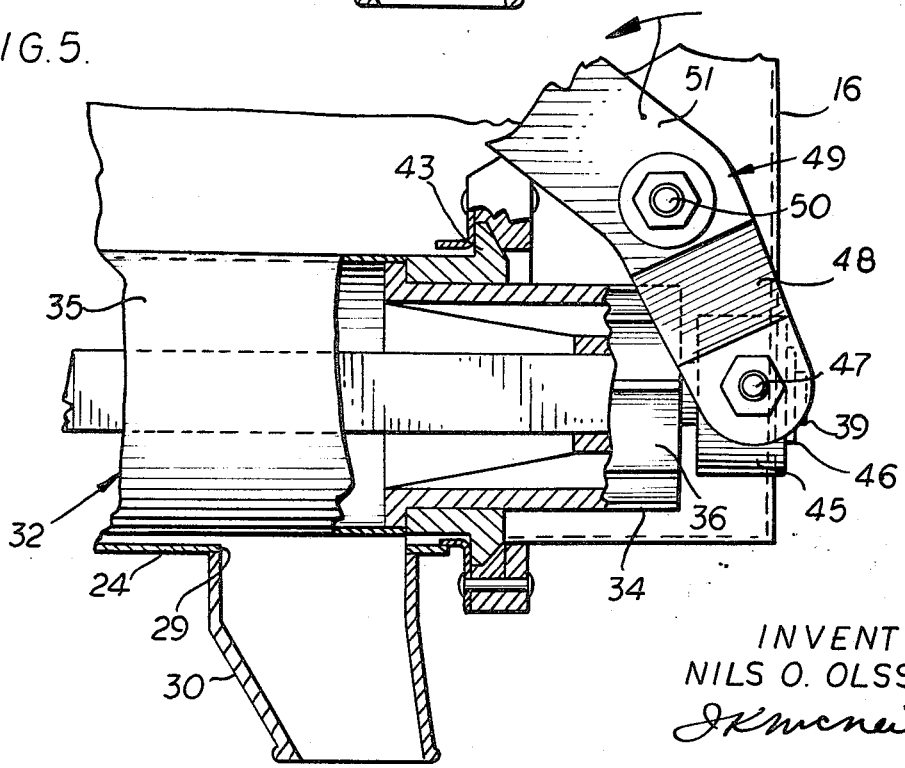
FIGURE 5 is a view similar to FIGURE 4 showing the fully closed position of the parts.

To discharge a lesser quantity of material through spouts 30, the lever 51 is adjustable within the limits of slot 53 about the axis of bolt 50 to axially shift member 32 from the fully opened position of FIGURE 3 to an intermediate position such as the partly open position of FIGURE 4 where only that portion of metering element 32 is exposed to the discharge outlet 29 and only that part of the fertilizer received in grooves 36 is discharged. By further swinging lever 49 counterclockwise as viewed in the drawings, outlets 29 are entirely closed by the smooth surfaced spacers 35.

It is believed that the construction and operation of the novel fluted feed metering apparatus of this invention will be clearly understood from the foregoing description. It should likewise be understood that the invention has been described in its preferred embodiment and that modifications may be made therein without departing from the spirit of the invention or the scope of the appended claims.

What is claimed is:

1. In an agricultural material distributor, an elongated hopper for said material, a bottom plate having spaced outlets therein from which said material in the hopper is discharged by gravity, a guide tube connected to each said outlet for conducting said material to the ground, and metering mechanism for controlling the discharge of said material from the hopper to said outlets including a cylindrical member extending lengthwise of and rotatably mounted in the material in the bottom of the hopper above and concentrically with at least a portion of said bottom plate, said cylindrical member comprising spaced metering elements, one for each said outlet having axially extending peripheral grooves adapted to be filled with said material and to be revolved to a position to discharge said material by gravity from said grooves into said outlet, said metering elements being separated by smooth surfaced spacers of substantially the same diameter as said metering elements, said cylindrical member being mounted in said hopper for axial shifting to and from a position with said metering elements substantially coextensive with the respective of said outlets for maximum discharge of material from said elements.

2. The invention set forth in claim 1, wherein adjustable means is mounted on said hopper and operatively connected to said cylindrical member for axially shifting the latter to expose selected lengths of said metering elements to said outlets while maintaining said metering element in contact with the material in said hopper.

3. The invention set forth in claim 2, wherein a bearing member is carried by one end of said cylindrical member and said adjustable means is a lever fulcrumed on said hopper and pivotally connected to said bearing member for axially shifting said cylindrical member upon rocking said lever about its fulcrum on the hopper.

4. The invention set forth in claim 3, wherein a cut-off device is mounted in said hopper and is substantially engageable with the periphery of said metering element to scrape therefrom material other than is contained in said grooves prior to discharge of material from said grooves into said outlet.

5. The invention set forth in claim 4, wherein said cylindrical member is axially shiftable by said adjustable means from a fully open position in which the grooves in each of said metering elements are substantially coextensive with the diameter of the respective of said outlets to a fully closed position in which substantially no portion of said metering elements are exposed to said outlets.

References Cited

UNITED STATES PATENTS

| 208,599 | 10/1878 | Hildrup et al. | 222—299 X |
| 234,335 | 11/1880 | Riter | 222—301 |

FOREIGN PATENTS

| 411,167 | 6/1910 | France. | |

ROBERT B. REEVES, *Primary Examiner.*

HADD S. LANE, *Examiner.*

UNITED STATES PATENT OFFICE
CERTIFICATE OF CORRECTION

Patent N. 3,387,751  Dated June 11, 1968

Inventor: Nils O. Olsson

It is certified that error appears in the above-identified patent and that the Letters Patent are hereby corrected as shown below:

Column 5 should be cancelled in its entirety.

Column 6 should be cancelled in its entirety.

SIGNED AND
SEALED

MAR 24 1970

(SEAL)
Attest:

Edward M. Fletcher, Jr.
Attesting Officer

WILLIAM E. SCHUYLER, JR.
Commissioner of Patents